United States Patent

[11] 3,623,703

| [72] | Inventor | Henrik Nielander<br>Schaufelbergerstrasse 58, 8055 Zurich,<br>Switzerland |
|---|---|---|
| [21] | Appl. No. | 882,613 |
| [22] | Filed | Dec. 5, 1969 |
| [45] | Patented | Nov. 30, 1971 |
| [32] | Priority | Dec. 10, 1968 |
| [33] | | Switzerland |
| [31] | | 18219/68 |

[54] MACHINE FOR MIXING AND PLASTICATING OF PLASTICS, RUBBER AND OTHER HIGHLY VISCOUS MATERIALS AT CONTROLLED PRESSURE, FRICTION AND SHEAR CONDITIONS
21 Claims, 25 Drawing Figs.

[52] U.S. Cl. .................................................. 259/3,
259/27, 259/47, 259/92
[51] Int. Cl. ...................................................... B01f 9/00
[50] Field of Search ........................................ 259/3, 5,
93, 91, 92, 94, 81, 86, 87, 88, 12, 14, 15, 16, 27,
35, 40, 47, 59, 102, 100, 101, 118

[56] References Cited
UNITED STATES PATENTS

| 452,129 | 5/1891 | Garrison...................... | 259/86 X |
| 570,360 | 10/1896 | Acheson....................... | 259/86 X |
| 2,662,489 | 12/1953 | Moffett ........................ | 259/94 |
| 2,859,017 | 11/1958 | Trumbull...................... | 259/92 |
| 3,023,455 | 3/1962 | Geier............................ | 259/2 X |
| 3,347,528 | 10/1967 | List .............................. | 259/2 |

Primary Examiner—Robert W. Jenkins
Attorney—Littlepage, Quaintance, Wray & Aisenberg ABSTRACT: A mixing and plasticating machine which comprises a mixing and plasticating cylinder and a mixing and plasticating rotor with passages, the shaft of said mixing and plasticating rotor being connected to a rotary drive outside the mixing and plasticating cylinder. The mixing and plasticating cylinder and the mixing and plasticating rotor are axially movable in relation to each other. By means of this relative axial motion of rotor and cylinder the inside wall of the mixing and plasticating cylinder is scraped off by the mixing and plasticating rotor and the material in the cylinder is pressed through said passages at friction and shear.

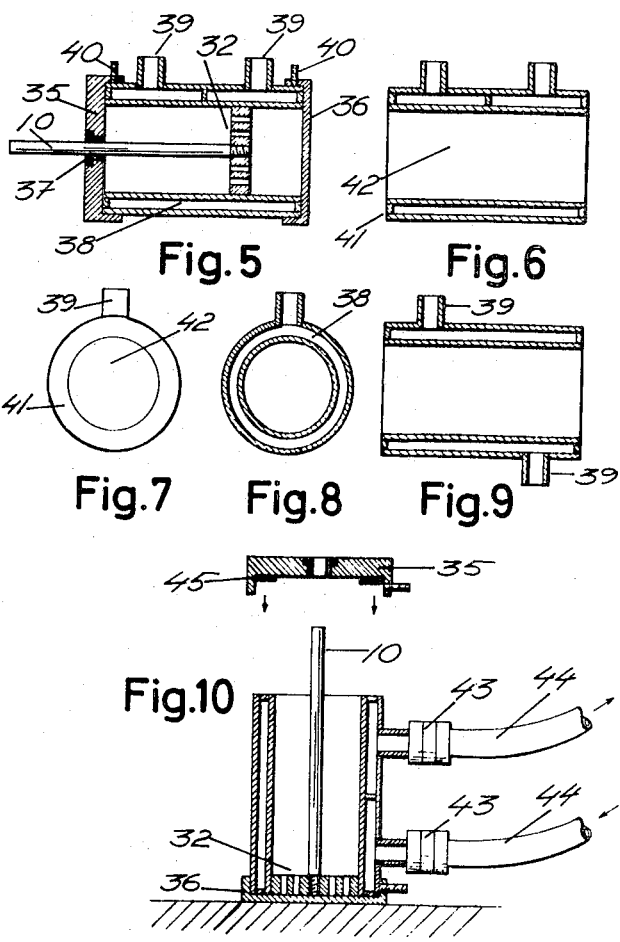

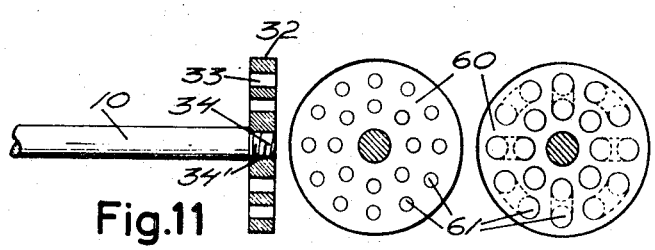
Fig.11  Fig.12  Fig.13
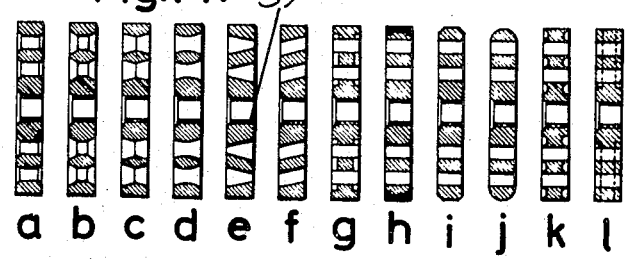
Fig.14:
a b c d e f g h i j k l
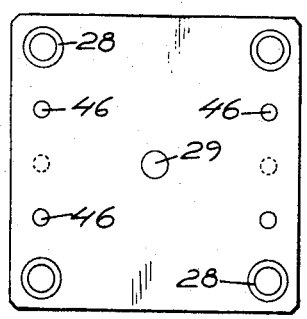 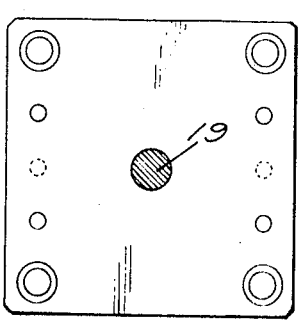
Fig.15  Fig.16
HENRIK NIELÄNDER
INVENTOR.

INVENTOR.
HENRIK NIELÄNDER
BY
Littlepage, Quaintance
Wray & Aisenberg

MACHINE FOR MIXING AND PLASTICATING OF PLASTICS, RUBBER AND OTHER HIGHLY VISCOUS MATERIALS AT CONTROLLED PRESSURE, FRICTION AND SHEAR CONDITIONS

This invention relates to a machine for mixing and plasticating of plastics, rubber and other highly viscous materials at controlled pressure, friction and shear conditions. Particularly, in the machine according to the invention the material to be mixed and plasticated may be worked at a very high specific mixing and plasticating pressure. The machine according to the invention may also be used as a mixing machine for materials in paste form, powder form or liquid form.

In prior art, for mixing and plasticating of plastics and rubber mainly roller mills and so called internal mixers were used. The latter mixers, also being called ram kneaders or Banbury mixers, comprise a closed mixing chamber in which two horizontal mixing and kneading means are rotated at different speeds, i.e. at friction. The pneumatically actuated ram presses the material into the mixing chamber and holds the material during the mixing and kneading process in the action area of the mixing and kneading means at a particular specific ram pressure or mixing pressure which normally is about 30 p.s.i., maximally about 170 p.s.i. However, as soon as the specific mixing pressure is raised above said normal value the power requirement of the internal mixer rises to an extremely high extent.

The above-mentioned internal mixers have important disadvantages. As already mentioned above, the specific mixing pressure, i.e. the specific ram pressure, is very low. Already at the normal specific mixing pressure of about 30 p.s.i. the power required is extremely high. As two mixing means are provided in the mixing chamber and as these rotate with very low differential speeds, complicated drives are required which due to the high power requirement necessarily are of large dimensions. The mixing chamber has a complicated configuration and is very difficult to clean and to repair. As the mixing chamber has at least two and in most cases four shaft seals, very difficult sealing and wearing problems are encountered. As the mixing means, too, have a complicated configuration, they are very expensive to manufacture and due to the inavoidable wear of the mixing means high repair costs arise. The internal mixers for laboratory trials are also very complicated and are of very large dimensions as well as of very high power requirement so that laboratory mixing trials at increased pressure up to now have been costly and difficult to carry out.

It is, therefore, an object of this invention to provide a mixing and plasticating machine having the following advantages, among others:

1. In the mixing and plasticating machine according to the invention, it should be possible to work the material to be mixed and plasticated at a controlled specific mixing and plasticating pressure of any desired value and at correspondingly controlled friction and shear forces without uneconomical rise of the power requirement of the machine. In the machine according to the invention it should be possible to work the material to be mixed and plasticated at a relatively low total drive power at a specific mixing and plasticating pressure as high as about 7,100 p.s.i. and more.
2. The machine according to the invention should have a cylindrical mixing and plasticating chamber with only one shaft seal.
3. The mixing and plasticating means should provide a very effective three-dimensional mixing and plasticating action in all parts of the cylindrical mixing and plasticating chamber.
4. When necessary, it should be possible to provide both the cylindrical mixing and plasticating chamber as well as the mixing and plasticating means with effective cooling or heating. An effective heat exchange should be provided between the internal cylinder wall of the cylindrical mixing and plasticating chamber, the mixing and plasticating means and the material to be mixed and plasticated.
5. The machine according to the invention should be of such design that the total internal wall area of the cylindrical mixing and plasticating chamber is scraped off by the mixing and plasticating means, so that the total contents is worked by the mixing and plasticating means and no incrustations and unmixed rests of mixing material are left in the cylindrical mixing and plasticating chamber.
6. Both the cylindrical mixing and plasticating chamber as well as the mixing and plasticating means should be easily accessible and capable of being disassembled for cleaning and repair.
7. The machine according to the invention should also be useful as a laboratory machine to carry out test series. It should be possible to carry out these test series without great expenditure and with simple and fast cleaning of the cylindrical mixing and plasticating chamber and the mixing and plasticating means between different trials.
8. The results obtained with the laboratory machine should be transferable in direct scale to large production size machines.

The present machine for mixing and plasticating of plastics, rubber and other highly viscous materials at controlled pressure, friction and shear conditions comprises a mixing and plasticating cylinder and a mixing and plasticating rotor with passages, the shaft of said mixing and plasticating rotor being connected to a rotary drive outside the mixing and plasticating cylinder, said mixing and plasticating rotor and said mixing and plasticating cylinder being axially movable in relation to each other, during said relative motion of said mixing and plasticating rotor and said mixing and plasticating cylinder the internal wall area of said mixing and plasticating cylinder being scraped off by said mixing and plasticating rotor and the contents of said mixing and plasticating cylinder being pressed through said passages of said mixing and plasticating rotor at friction and shear.

Thus, either the mixing and plasticating rotor may be axially movable, whereas the mixing and plasticating cylinder is fixed, or the mixing and plasticating rotor may be axially not movable, whereas the mixing and plasticating cylinder is axially moved. During the mixing and plasticating process the mixing and plasticating rotor is pressed at any desired pressure against the mixing and plasticating material, the mixing and plasticating material being pressed through the passages of the mixing and plasticating rotor in similarity to maccaroni, i.e. in the form of strings or ribbons, as for example may be the case when using fixed strainer plates with bores in plastic and rubber extruders to hold the sieves used for cleaning the extruded material. During the simultaneous rotation and axial motion of the mixing and plasticating rotor these material parts similar to strings are sheared off continuously and forced together in radial direction as well as in axial direction, so that very high shear forces or shear gradients may be attained. Moreover, as the mixing and plasticating material is pressed against the rotor area between the passages of the mixing and plasticating rotor, friction forces of any desired value may be attained, these friction forces, as known, being very important to the mixing and plasticating process, even in the molecular area. Furthermore, the attainable friction forces are of great importance for the generation of heat in the mixing and plasticating material by conversion of mechanical work, as commonly known, e.g. in the case of adiabatically working extruder screws and plasticating screws. Unexpectedly, it has been found that the material to be mixed and plasticated in the machine according to the invention not necessarily has to be exclusively flowable or plastic, as is absolutely necessary when using the above-mentioned extruder strainer plates. In the machine according to the invention said mixing and plasticating effect is attained also with powdery, granular or solid materials in the form of lumps. If said powdery, granular or solid materials are organic thermoplastic substances, these are plasticated to the required extent during the mixing and plasticating process, and if said materials are inorganic or nonthermoplastic materials, they are size reduced, comminuted, milled or dispersed to the required extent during the mixing and plasticating process. Thus, in the machine according to the invention, plastics, rubber and other highly viscous or liquid materials may be very effectively and homogeneously mixed and plasticated with powdery or granular fillers, pigments, dyestuffs and other chemical additives, e.g. raw rubber with carbon black and other usual additives, etc.

In order that the invention may be more clearly understood some embodiments thereof will now be described, by way of example, with reference to the accompanying drawings in which:

FIG. 5 is a detailed longitudinal sectional view of the mixing and plasticating cylinder and the mixing and plasticating rotor;

FIG. 6 is a longitudinal sectional view of the mixing and plasticating cylinder without the mixing and plasticating rotor and without cylinder end lids;

FIG. 7 is a front view of the mixing and plasticating cylinder of FIG. 6;

FIG. 8 is a cross-sectional view of the mixing and plasticating cylinder of FIG. 6;

FIG. 9 is a side-elevational view of the mixing and plasticating cylinder of FIG. 6 with another arrangement of the pipe connections for cooling or heating medium;

FIG. 10 illustrates the mixing and plasticating cylinder with the mixing and plasticating rotor and the two cylinder lids in a position where the mixing and plasticating material may be filled into the mixing and plasticating cylinder;

FIG. 11 is a detailed longitudinal sectional view of the mixing and plasticating rotor and the shaft thereof;

FIG. 12 and FIG. 13 illustrate different embodiments of the mixing and plasticating rotor and the passages in front view, viewed from the shaft;

FIG. 14 is a longitudinal sectional view of different embodiments of the mixing and plasticating rotor and the passages;

FIG. 15 is a front view of the axially movable platen 5 according to FIG. 1;

FIG. 16 is a rear view of the axially movable platen 6 according to FIG. 1;

Figure 1:
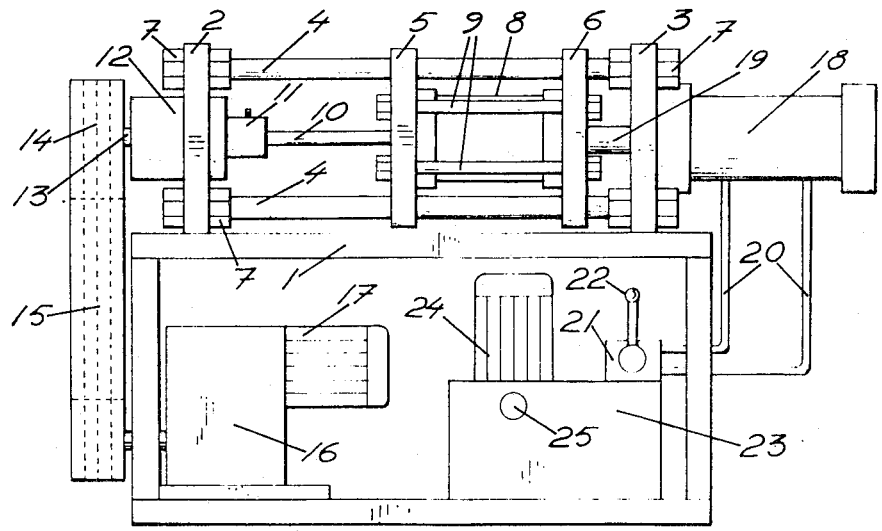
FIG. 1 is a side elevational view of a simple embodiment of the machine according to the invention, the mixing and plasticating rotor being axially not movable, whereas the mixing and plasticating cylinder is axially movable.
Figure 17:
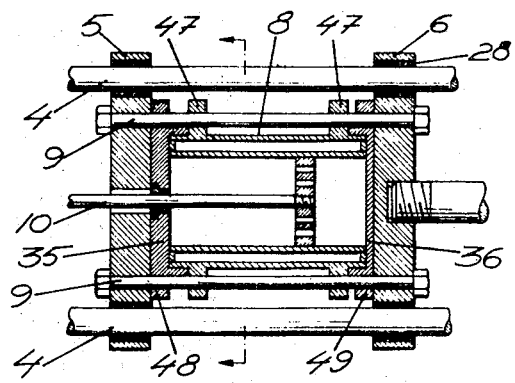
FIG. 17 is a side-elevational view of another embodiment of the mounting of the mixing and plasticating cylinder illustrated in FIG. 3.
Figures 18, 19:
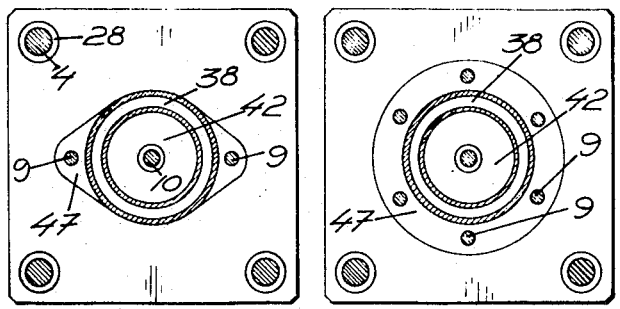
Figure 20:
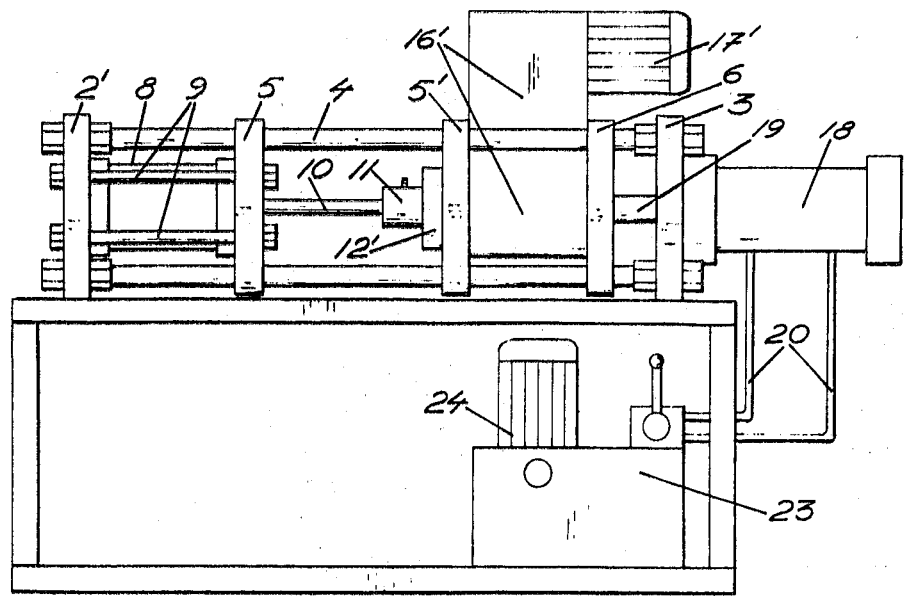
Figure 21:
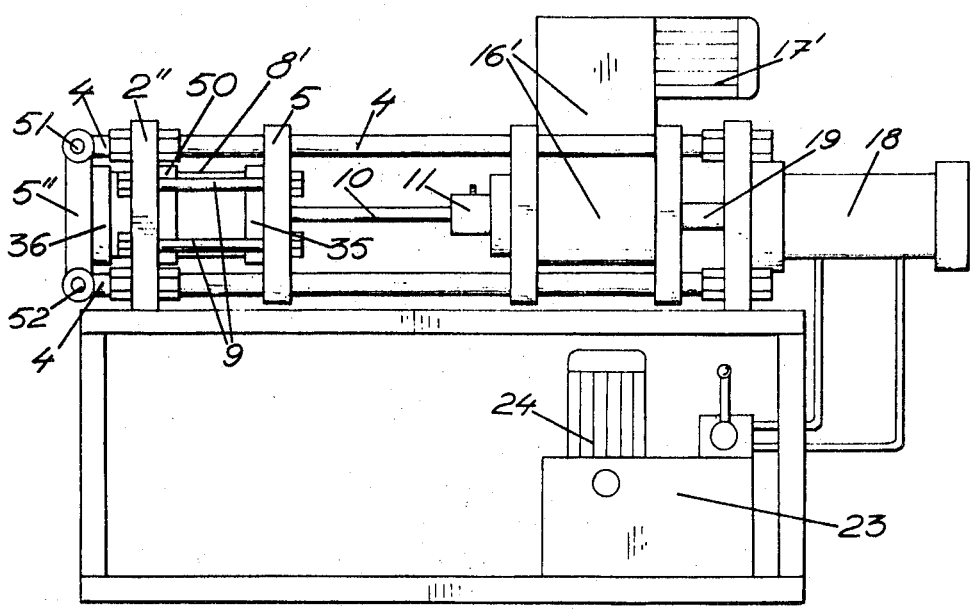
Figure 22:
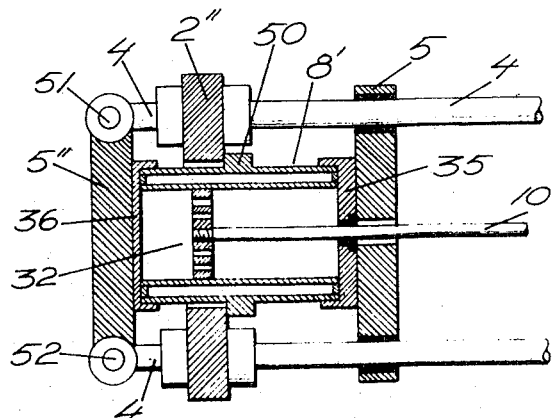
Figure 23:
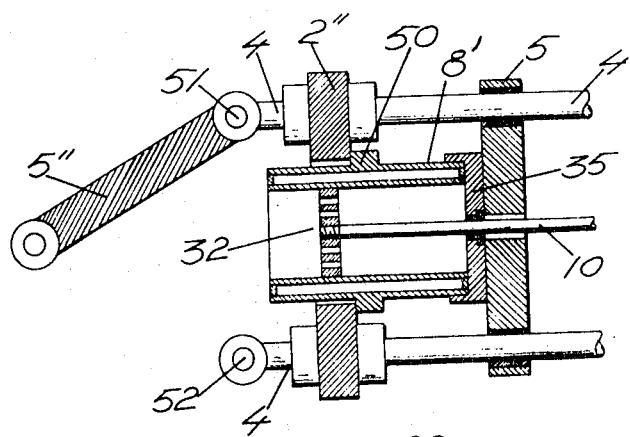
Figure 24:
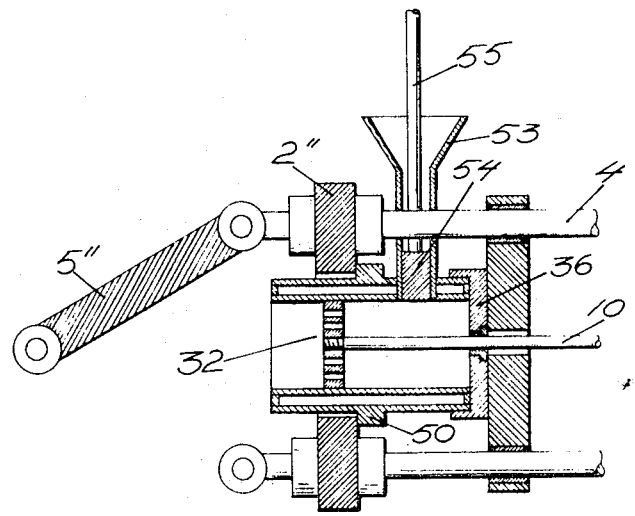
Figure 25:
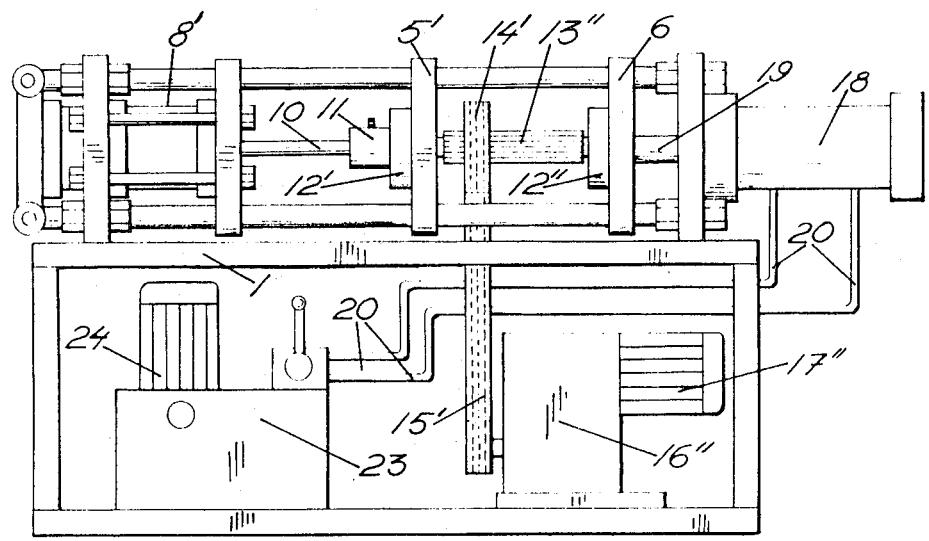

FIG. 18 and FIG. 19, respectively, represent a cross-sectional view of two different mixing and plasticating cylinders according to FIG. 17;

FIG. 20 is a side-elevational view of a machine in which contrary to the machine represented in FIG. 1 the mixing and plasticating rotor together with the rotary drive is axially movable whereas the mixing and plasticating cylinder is axially not movable;

FIG. 21 is a side-elevational view of a machine according to FIG. 20, the axially not movable mixing and plasticating cylinder being provided for filling and emptying from the end;

FIG. 22 is a longitudinal sectional view of the mixing and plasticating cylinder and the mixing and plasticating rotor according to FIG. 21;

FIG. 23 illustrates the mixing and plasticating cylinder according to FIG. 22, the mixing and plasticating cylinder being opened for filling or emptying;

FIG. 24 illustrates the mixing and plasticating cylinder according to FIG. 23, the mixing and plasticating cylinder being provided with a feeding hopper and a feeding ram;

FIG. 25 is a side-elevational view of a machine according to FIG. 21, with the difference, however, that only the mixing and plasticating rotor is axially movable, whereas the rotary drive connected to the mixing and plasticating rotor is axially not movable.

The drawings are hereinafter explained in detail:

Referring to FIG. 1, the machine illustrated comprises a machine base 1, on which the two fixed platens 2 and 3 are mounted. These two platens are fixed on 1. The platens 2 and 3 are firmly connected to each other by four tie rods 4 as well as the tie rod nuts 7, so that the press structure of a horizontal four-tie rod press is formed. Between the platens 2 and 3 and on the tie rods 4 two axially movable platens 5 and 6 are provided. The mixing and plasticating cylinder 8 is mounted in screw vise manner between the two platens 5 and 6 by four tie bolts 9 and secured against rotation; together with 5 and 6, however, it is axially movable. The shaft 10 of the mixing and plasticating rotor, being guided through a bore of the axially movable platen 5, is mounted in the coupling 11 in such a way that the shaft is firmly connected to the coupling at all occurring torques and axial forces. Twelve is a bearing housing firmly connected to platen 2, the drive shaft 13 being mounted in said bearing housing. The front part of drive shaft 13 is provided as a coupling 11. Fourteen is a drive pulley connected to the drive shaft 13, the pulley being connected to the gear motor 16, 17 via the transmission 15; 16 being the gear box and 17 the motor. The transmission 15 may be a V-belt drive, gear belt drive, chain drive or gear drive. The gear drive 16 may have a fixed r.p.m. value or it may be a variable speed drive. Eighteen is a double-action working cylinder, in this case a hydraulic cylinder, which is mounted at the fixed platen 3 so that the piston rod 19 of the hydraulic cylinder 18 is guided through a bore of platen 3 and firmly screwed together with 6. Twenty represents the oil lines of 18, 21 is a hydraulic valve with a pressure control valve and 22 is the switch lever of 21. Twenty-three is the hydraulic pump group with oil container, 24 the motor of the hydraulic pump group and 25 is a manometer.

Figure 2:
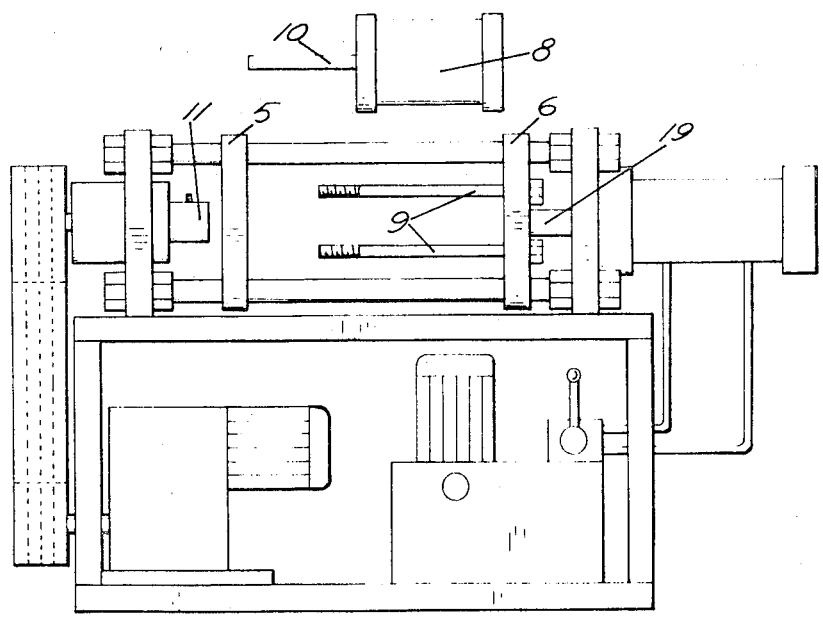
FIG. 2 illustrates the machine of FIG. 1, with the difference, however, that the mixing and plasticating cylinder and the mixing and plasticating rotor are dismounted from the machine and illustrated above the machine in a position from which they may be mounted in the machine again.

From FIG. 2 it is seen that 5 is axially freely movable and may be manually moved on the tie rods 4 in both directions. It is also seen that 6 is firmly connected to 19 and that it may be axially moved on the tie rods only by actuation of the hydraulic cylinder 18.

Figure 3:
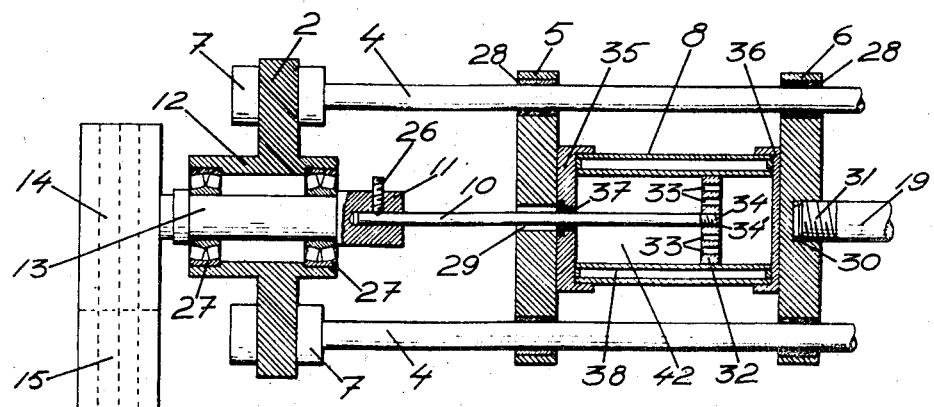
FIG. 3 is a longitudinal sectional view of the mixing and plasticating cylinder, the mixing and plasticating rotor as well as the bearing assembly and rotating drive thereof as illustrated in FIG. 1.

In FIG. 3 the mixing and plasticating cylinder 8 is mounted between 5 and 6, the tie bolts 9 of FIG. 1 and FIG. 2 being not illustrated for reasons of a more clear illustration. Twenty-six is a pin screw with conical or round point being screwed into a corresponding cavity of the shaft 10, thus firmly connecting and securing the shaft to the coupling 11 with respect to both torques and axial forces. Of course, any other type of connection may be used, as for example wedge, flange and screw connections. The drive shaft 13, the front part of which is provided as a coupling 11, is mounted in the spherical self-aligning bearings 27. The bearings have such dimensions that they can take up all occuring radial and axial forces. Also other types of bearings may be used, provided that they can take up the above-mentioned forces, e.g. tapered roller bearings and axial groove ball bearings. The axially movable platens 5 and 6 are mounted on the tie rods 4 by guide bushings 28 of usual type. The guide bushings 28 may be made of bronze, sintered bronze or bimetallic material; moreover, ball bushings may be used. The tie rods 4 may be hard chromium plated. Twenty-nine is a bore in 5 giving free passage to the shaft 10. Thirty is a thread hole in 6, the piston rod 19 with the thread 31 being firmly screwed into said hole. Of course, 19 may be connected to 6 in any other suitable way. Thirty-two is the mixing and plasticating rotor with the aperture passages 33. The shaft 10 of the mixing and plasticating rotor is via the thread 34 firmly screwed into the corresponding thread 34' of the mixing and plastication rotor, the threading direction being chosen so that the thread is not loosened at the rotation. Of course, the shaft 10 may also be firmly connected to the mixing and plasticating rotor in any other suitable way, e.g. by welding connection, wedge connection or flange connection. They may also be manufactured in one piece. Thirty-five is the front cylinder lid, 36 the rear cylinder lid. In the front cylinder lid 35 a seal bushing 37 for the shaft 10 is mounted. The front part of the seal bushing 37 has a larger diameter than the bore 29 and from FIG. 3 it is seen, that when the mixing and plasticating cylinder 8 is firmly mounted, 37 is also firmly mounted and it cannot move at the occuring axial forces. Thirty-seven is made of bronze, sintered bronze, bimetal or a heat resistant plastic material. For this purpose, fluorinated hydrocarbon polymers and silicones are particularly suitable. If the mixing and plasticating cylinder 8 together with the two cylinder lids 35 and 36 is dismounted from the machine, the seal bushing 37 may be very easily changed. This is a great advantage, e.g. when mixing highly abrasive materials. Of course, also suitable seal boxes of any type may be used. Thirty-eight is the jacket of the mixing and plasticating cylinder 8, by which the mixing and plasticating chamber 42 may be cooled or heated as desired, e.g. using cooling water, heating water, steam, heat exchanging fluids, such as chlorodiphenyl, silicone oil, mineral oil, etc. The pipe connections for the cooling or heating medium are not illustrated in FIG. 3. The mixing and plasticating cylinder 8 may of course also be electrically heated, e.g. using heating collars, heating rods, heating spirals or heating cartridges. As the whole circumference of the mixing and plasticating cylinder 8 serves as a heat exchanger area, an extremely efficient cooling or heating of the mixing and plasticating material is achieved.

Figure 4:
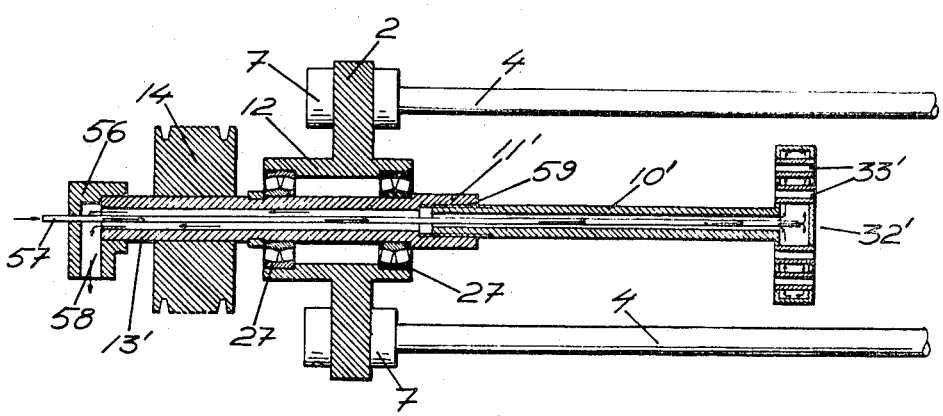
FIG. 4 is a similar longitudinal sectional view of the mixing and plasticating rotor, the latter, however, being hollow in order to be cooled or heated.

Still better cooling or heating of the mixing and plasticating material is achieved if the mixing and plasticating rotor of FIG. 4 is made hollow. In FIG. 4 the hollow shaft 10 with thread 59 of the hollow mixing and plasticating rotor 32' is firmly screwed into the corresponding thread of the coupling 11'. The drive shaft 13' is also hollow and connected to a rotary liquid joint 56 for cooling or heating medium. Fifty-seven is the injection pipe for cooling or heating medium, said pipe reaching into the mixing and plasticating rotor 32'. Fifty-eight is the exit orifice for cooling or heating medium. The circulation arrows in FIG. 4 show the flow of the cooling or heating medium in the mixing and plasticating rotor. The passages 33' of the mixing and plasticating rotor are in this case provided by tube pieces, which are welded into the hollow mixing or plasticating rotor or rolled into it, as is common practice in the case of tube heat exchangers, Thus, the hollow mixing and plasticating rotor of FIG. 4 may also be considered as a very short tube heat exchanger. At the rotation of the hollow mixing and plasticating rotor an extremely advantageous flow of the cooling or heating medium is attained. Moreover, due to the action of the centrifugal force, the heat transfer value between the cooling or heating medium and the rotor area is substantially increased. Thus, with the hollow mixing and plasticating rotor according to FIG. 4, the temperature of the mixing and plasticating material may be very effectively controlled. The heating of the hollow mixing and plasticating rotor 32' may, of course, also be carried out electrically; in this case, instead of the injection pipe 57 a heating cartridge or heating spiral is provided in 32' and the rotary liquid joint 56 is designed as a rotary electric joint. If the mixing and plasticating rotor is heated, for example solid plastic blocks, plastic rods or plastic tablets as well as plastic powder or plastic granulate may be plasticated or melted in very short time.

FIG. 5 is a detailed longitudinal sectional view of the mixing and plasticating cylinder and the mixing and plasticating rotor according to FIG. 3, however, they are dismounted from the rest of the machine. Thirty-nine are the pipe connections for cooling or heating medium (not illustrated in FIGS. 1-3). Forty are pin screws to secure the cylinder lids 35 and 36 during the handling of the mixing and plasticating cylinder outside the rest of the machine, e.g. at filling or charging. Thus, the cylinder lids 35 and 36 may be very easily removed and FIG. 6 illustrates the mixing and plasticating cylinder 8 without cylinder lids. From FIG. 6 it is seen, that the cleaning of the mixing and plasticating cylinder after the finished mixing and plasticating process is extremely simple. The mixing and plasticating cylinder only has to be scraped out with a spatula or wiped clean with a cleaning rag. Forty-one are the end surfaces of the mixing and plasticating cylinders and 42 is the mixing and plasticating chamber. FIG. 7 illustrates the mixing and plasticating cylinder according to FIG. 6 in front view and FIG. 8 in cross section. FIG. 9 illustrates the mixing and plasticating cylinder according to FIG. 6 with another configuration of the pipe connections 39 for cooling or heating medium. FIG. 10 shows the mixing and plasticating cylinder together with the mixing and plasticating rotor and the two cylinder lids in a position from which the mixing and plasticating material may be filled into the mixing and plasticating cylinder. Forty-three are the tube couplings and 44 the tubes for the cooling or heating medium. Forty-five is a packing of suitable material, said packing may be provided between the cylinder lids 35 and 36 and the plane end surfaces of the mixing and plasticating cylinder 8.

The function of the described machine is as follows

The mixing and plasticating cylinder 8 with the cylinder lid 36, the latter being secured to the mixing and plasticating cylinder by the pin screw 40, is placed on a horizontal surface, for example a laboratory table (FIG. 10). The mixing and plasticating rotor 32 is placed into the mixing and plasticating chamber and the mixing and plasticating material is charged into the mixing and plasticating chamber, e.g. raw rubber or plastic lumps, plastic granulate, plastic powder, etc., as well as fillers, pigments, etc. Thereafter the cylinder lid 35 is placed upon the mixing and plasticating cylinder 8, so that the shaft 10 of the mixing and plasticating rotor is guided in the seal bushing 37, and then the cylinder lid is secured to the mixing and plasticating cylinder 8 by turning the pin screw 40 tight. However, one may also proceed so that the mixing and plasticating chamber first is filled and after that the mixing and plasticating rotor is placed upon the mixing and plasticating material and finally the cylinder lid 35 is put in place. The mixing and plasticating cylinder, which has been filled with material in said way, may now be comfortably handled in any position and may be mounted in the machine as illustrated in FIG. 2. To this end the mixing and plasticating cylinder is lowered down between the axial movable platens 5 and 6, so that the center line of the mixing and plasticating cylinder coincides with the center line of the axially movable platens 5 and 6. Now, 5 is manually moved to the right, so that the tie bolts 9 are guided through the corresponding bores in 5. By pulling the nuts belonging to the tie bolts 9 tight, the mixing and plasticating cylinder is fixed in screw vise manner between 5 and 6 and secured against rotation. By actuation of the lever rod 22 (FIG. 1) the piston rod 19 of the hydraulic cylinder 18 is put in motion and the mixing and plasticating cylinder 8, which is mounted between 5 and 6, is moved to the left, so that the shaft 10 is pressed into the coupling 11 (FIG. 3). Then the pin screw 26 is screwed into the corresponding cavity of the shaft 10, so that said shaft is firmly connected to the coupling 11 with respect to both torques and axial forces. The tubes 44 for cooling or heating medium may either be connected to the mixing and plasticating cylinder 8 at the filling of the mixing and plasticating chamber and may be circulated by cooling or heating medium (FIG. 10), or they may also be connected first after the mounting of the mixing and plasticating cylinder 8 between 5 and 6. From FIG. 10 it is seen that the tubes 44 do not bother neither the filling nor the cleaning of the mixing and plasticating cylinder 8, and thus, the cooling or heating medium may be circulated through the jacket 38 of the mixing and plasticating cylinder 8 during a whole trial series, this being an important advantage at the practical work with the trial series. In the lines for cooling or heating medium naturally thermometers or thermostats are provided for temperature control.

Thus, before the startup of the machine the mixing and plasticating cylinder 8 is either in the position at the far right, so that the mixing and plasticating rotor 32 is adjacent to the cylinder lid 35, or at the far left, so that the mixing and plasticating rotor is adjacent to the cylinder lid 36. By starting the motor 17, the mixing and plasticating rotor is put into rotation and the piston rod 19 of the hydraulic cylinder 18 is put into motion by actuation of the lever rod 22, so that the mixing and plasticating cylinder 8 is moved to the other end position, i.e. until the other cylinder lid is coming into touch with the mixing and plasticating rotor 32. In this way, the mixing and plasticating rotor 32 performs a complete stroke in the mixing and plasticating cylinder 8. After the end position has been reached, the hydraulic valve 21 is shifted, so that a complete stroke is performed in the other direction. In this way the required number of strokes is performed. The shifting of the hydraulic cylinder 18 may be performed all manually at visual observation of the end positions, which is quite practical, e.g. at laboratory trials, as normally an excellent mixing and plasticating result is achieved already at a very low number of strokes. Of course, the shifting also may be performed electrically with end position switches and electrical hydraulic valves. The machine may also be automated by computing the desired number of strokes on an electronic preset counter, the machine being switched off automatically after the preset number of strokes has been attained. After the mixing and plasticating process has been completed, the mixing and plasticating cylinder 8 is dismounted from the machine again, whereafter the cylinder lids 35 and 36 are removed and the contents of the mixing chamber is pressed out of the mixing and plasticating chamber by the aid of the mixing and plasticating rotor 32. The mixing and plasticating cylinder 8, the cylinder lids 35 and 36 as well as the mixing and plasticating rotor 32 thereafter may be very rapidly and easily cleaned. Thus, with the machine described, trial series may be carried out without the work being obstructed by time consuming and difficult cleaning procedures, as in the case of prior art laboratory internal mixers.

FIG. 11 is a detailed longitudinal sectional view of the mixing and plasticating rotor 32 with the shaft 10. From the figure it is seen that the thread 34 of shaft 10 has a smaller diameter than the shaft 10 itself, so that the shaft is not screwed through the mixing and plasticating rotor 32 at high torques. FIG. 12 and FIG. 13 show the mixing and plasticating rotor in front view, viewed from the shaft 10, with different cross sections of the passages. In FIG. 13 the passages are partly connected to each other, so that passages having a slot cross section are provided. Sixty is the so called frictional area, i.e. the rotor area between the passages. Sixty-one is the so called shear area, i.e. the cross-sectional area of the passages. Both these terms are explained more in detail hereinafter. The passages may be provided in any desired symmetrical configuration and in addition to the circular and slotted passages illustrated in FIGS. 12 and 13 one may of course also use passages of any another cross section, for example passages with elliptical or polygonal cross section.

FIG. 14 is a longitudinal sectional view of different embodiments of the mixing and plasticating rotor 32, FIGS. 14a–14f illustrating different flow geometrical embodiments of the passages 33. It is obvious, that the most suitable flow geometry of the passages in each case depends on the rheological properties of the mixing or plasticating material and may be found out by practical trials. FIGS. 14a, 14b and 14c illustrate different double-conical bores or beveled slots. FIG. 14d illustrates passages, the longitudinal sectional lines of which describe a curve, e.g. a circle, parable or hyperbola. FIG. 14e illustrates tapered bores or beveled slots which are converging in the same direction or in opposed directions. FIG. 14f illustrates beveled bores or slots, which may be converging or parallel or be provided in screw line configuration in relation to the centerline of the mixing and plasticating rotor. In FIG. 14g, concentrical grooves or tracks are provided in the rotor surface. The width of said grooves or tracks may either be smaller or larger than the radial distance between two adjacent passages. In the first case the grooves or tracks are continuous, in the latter case the grooves or tracks are interrupted, so that the rotor surface is provided with projections in the form of teeth or pins. By these projections in the form of teeth or pins, additional shear, milling and dispersion effects may be provided with certain materials. According to FIG. 14h, the periphery of the mixing and plasticating rotor is made of another material than the material of the mixing and plasticating rotor itself. As such a material, a plastic may be used, such as the above-mentioned fluorinated hydrocarbon polymers, thus providing a better scrape off of the internal wall surface of the mixing and plasticating cylinder and reducing the friction between the mixing and plasticating rotor and the internal wall surface. Also metallic materials may be used for this purpose, such as bronze or bimetal. In the case of highly abrasive mixing or plasticating materials, the mixing and plasticating rotor may also be lined with hard materials, e.g. hard metals or ceramic materials, such as tungsten carbide, chromium carbide, titanium carbide and alumina. FIG. 14i illustrates the mixing and plasticating rotor with beveled peripheral edges and FIG. 14j illustrates rounded peripheral edges. FIG. 14k illustrates the mixing and plasticating rotor with grooves or tracks similar to FIG. 14g, in this case, however, the grooves or tracks are of a half-circular cross section. The grooves or tracks of FIG. 14g or FIG. 14k may also be provided in helical configuration in the rotor surface in order to provide an additional transport of material from the internal wall surface of the mixing and plasticating cylinder to the passages of the mixing and plasticating rotor during the rotation of the latter. Finally, FIG. 14l illustrates a mixing and plasticating rotor with radial grooves, tracks, notches or slots.

FIG. 15 is a front view of the axially movable platen 5 according to FIG. 3 with the bore 29 for the passage of shaft 10 and having four bores 46 for the tie bolts 9. In the case of relatively low drive torques and axial forces, also two tie bolts 9 may be sufficient, these being indicated between the bores 46. FIG. 16 is a rear view of the axially movable platen 6, viewed from the piston rod 19.

FIG. 17 is a side-elevational view of another mounting embodiment of the mixing and plasticating cylinder 8 according to FIG. 3, the mixing and plasticating cylinder, however, having a flange 47 at each end and the two cylinder lids 35 and 36 also having corresponding flanges 48 and 49 respectively. All flanges are provided with bores for the tie bolts 9. The mounting of the mixing and plasticating cylinder 8 in the machine is as described above, the only difference being that the tie bolts 9 are guided through said flange bores and thus the mixing and plasticating cylinder 8 together with the cylinder lids is secured against any rotation or radial moving. The mounting of the mixing and plasticating cylinder 8 illustrated in FIG. 3, the mixing and plasticating cylinder being mounted in screw vise manner between the two platens 5 and 6 and being secured against rotation by the friction against the platens, is sufficient at low drive torques, e.g. in the case of laboratory machines and small size production machines. The mounting of the mixing and plasticating cylinder illustrated in FIG. 17, on the other hand, is suitable for drive torques and cylinder diameters of any size. FIG. 18 is a cross-sectional view of a mixing and plasticating cylinder in the section marking line according to FIG. 17. In this case two tie bolts 9 are used and the above-mentioned flanges are provided with only two flange bores. FIG. 19 also represents a cross-sectional view of a mixing and plasticating cylinder according to FIG. 17, with the difference, however, that six tie bolts 9 are used. In the case of very large machines with corresponding drive torques and axial forces, naturally, a still larger number of tie bolts may be used. In the case of machines of said size, the mixing and plasticating cylinder may have a filling opening and an emptying opening, so that the mixing and plasticating cylinder has not to be dismounted from the machine for filling or dumping. Thus, the mixing and plasticating cylinder may for example be provided with a filling hopper as well as a closure at the top and be provided with an emptying door at the base.

An important advantage of the above-described mounting embodiments of the mixing and plasticating cylinder in the machine of the invention is that the centerlines of the mixing and plasticating cylinder and of the mixing and plasticating rotor always coincide exactly with the connection line between the drive shaft and the power vector of the linear motor or hydraulic cylinder, independent of the size of the mixing and plasticating cylinder and the size of the torques and axial forces as well as any expansion or contraction of the mixing and plasticating cylinder due to temperature changes. Thus, any stalling or "clinching" of the mixing and plasticating rotor in the mixing and plasticating cylinder due to bad centering or misalignment is excluded. For the same reason, there is also no bending or deflection stress acting on the shaft 10 of the mixing and plasticating rotor.

In order to give a more detailed explanation of the factors and processes to be observed at the operation of the machine of the present invention, particularly with respect to the pressure, friction and shear conditions, some theoretical terms and definitions are given below. However, it is explicitly stated, that these theoretical terms and definitions only are given for the purpose of a better understanding of the invention and they shall by no means limit or reduce the scope of the invention. Within the scope of the invention also other terms and definitions may be used.

It has been mentioned above, that the mixing and plasticating material at the operation of the machine according to the invention is pressed in string form or ribbon form through the passages of the mixing and plasticating rotor and it makes no difference whether the mixing and plasticating material is tough-elastic, high viscous, in powder form or granular form. At the simultaneous rotation and axial motion of the mixing and plasticating rotor with respect to the mixing and plasticating cylinder, these material parts in string form are sheared off continuously. For example, it may be assumed that the mixing and plasticating cylinder is filled with a solid piece of rubber and that the mixing and plasticating rotor is pressed against the rubber by actuation of the hydraulic cylinder 18, without any rotation, however. If the pressure is sufficiently high, so that the cold flow limit of the rubber is exceeded, part of the rubber is pressed into the passages of the mixing and plasticating rotor. At sufficient long action of the press force, in this way, theoretically, the whole amount of rubber could be pressed through the passages. However, a practically useful mixing or plasticating effect is not achieved in this case. If the same trial is conducted with material in powder or granular form, only a certain compression of the material is provided and thereafter the mixing and plasticating rotor cannot proceed further, as these materials have no cold flow properties. Thus, friction and shear forces necessary for a practically useful mixing and plasticating effect may be produced only if the mixing and plasticating rotor also is rotated with a certain drive torque. The shear and friction forces between the mixing and plasticating rotor and the rubber in the above-mentioned example may be compared to the shear and friction conditions at two steel plates riveted together. If one of the steel plates is fixed and the other steel plate is rotated with a sufficiently high torque, the rivets are sheared off. Thus, the total cross-sectional area of the rivets and rivet bores, respectively, may be called "shear area" and the surface between the rivet bores may be called "friction area." Thus, the following definitions may be used:

If the diameter of the mixing and plasticating rotor is called D, the
Rotor area = $\pi D^2/4$
If the bore diameter is called $d$, the
Bore area = $\pi d^2/4$
This gives the Shear area = The total bore area = $\Sigma \dfrac{\pi d^2}{4}$ Friction area = (Rotor area − Shear area)
= $\left(\dfrac{\pi D^2}{4} - \Sigma \dfrac{\pi d^2}{4}\right)$, i.e. the area between the bores;
Percental shear area (%) = Shear area/Rotor area·100;
Percental friction area (%) = Friction area/Rotor area·100;
If the pressure force acting on the mixing and plasticating rotor is called F (pounds), the Specific rotor pressure = $p = \dfrac{F}{\dfrac{\pi D^2}{4}}$ (p.s.i.);

and further the
Friction area pressure = $f = F$/Friction area (p.s.i.);
When calculating the friction area for the shaft side of the mixing and plasticating rotor, the cross-sectional area of the shaft has to be deducted, of course.

For the axial motion of the mixing and plasticating rotor, in addition to the pressure force, the stroke or the stroke length, the motion speed as well as the stroke number are of importance. The stroke is the length of the mixing and plasticating cylinder minus the thickness of the mixing and plasticating rotor. For the rotational motion of the mixing rotor, the torque and the revolutions per minute as well as the resulting peripheral speed of the mixing and plasticating rotor are of importance. In this connection, the peripheral speed for the radial distance of the passages from the center of the mixing and plasticating rotor is considered.

From the above it is seen, that the specific rotor pressure may be chosen as desired by using a linear motor or working cylinder with a corresponding pressure force. Normally, a pressure force from about 1,000 to about 1,000,000 pounds and more may be used, depending on the rotor diameter. The generation of large pressure forces is connected with rather little technical expenditure, as simply the power demand of the linear motor or hydraulic cylinder and the corresponding hydraulic pump group have to be adjusted to the pressure force and the motion speed, big and complicated mechanical drives thus being unnecessary. Of course, the torque of the mixing and plasticating rotor has to be adjusted to the specific rotor pressure chosen at any time. By changing the torque and the r.p.m. of the mixing and plasticating rotor, the friction and the shear force, shear speed, shear gradient, etc. may be controlled as desired. Thus, the machine according to the present invention makes it possible to carry out mixing and plasticating processes at controlled pressure, friction and shear conditions. As the torque of the mixing and plasticating rotor only has to be sufficiently high that the mixing and plasticating material adjacent to the rotor area is worked with the necessary shear and friction forces, the required total drive power is surprisingly low. This is understood by considering that at any time only a differential cross-sectional part of the mixing and plasticating cylinder is worked at the rotation of the mixing and plasticating rotor, whereas, on the other hand, the axial motion of the mixing and plasticating rotor through the mixing and plasticating cylinder results in a mechanical integration of the contents of the cylinder. In contrast to this, in the internal mixers of prior art the total contents of the mixing chamber is worked practically at the same time and thus extremely high drive power is required. In the extraordinary large dimension gear drives of the prior art internal mixers a great part of the drive power is lost due to mechanical friction losses in the gear drive. As in the machine of the present invention the main part of the drive power is put into the linear motor or hydraulic cylinder to generate the necessary pressure force, without using any big gear drives, the above-mentioned losses are avoided. Thus, the machine of the present invention has a considerably higher degree of efficiency than the internal mixers of prior art.

From FIG. 1 it is seen that mixing and plasticating cylinders of different lengths and different diameters may be mounted in the same machine. If, at constant drive power, a mixing and plasticating cylinder of constant diameter but with greater length and corresponding greater amount of mixing and plasticating material is mounted in the machine, only the required mixing and plasticating time is increased, i.e. the total energy need is increased, while the drive power need remains constant. The total drive power only has to be increased if also the diameter of the mixing and plasticating cylinder is increased. From this it is also seen that the drive power values for different cylinder sizes may be calculated practically according to scale, if the power values for one cylinder size are known. Thus, it is a substantial advantage of the machine of the present invention that laboratory trials in small scale may be applied to large production machines nearly true to scale.

The diameter of the bores or the width of the slots may be from about 1 to about 20 percent of the rotor diameter; a bore diameter or a slot width from about 5 to about 15 percent of the rotor diameter being particularly advantageous. The percental shear area may be from about 5 to about 50 percent of the rotor area, a percental shear area from about 15 to about 40 percent being particularly preferred. The ratio between the percental shear area and the percental friction area is of substantial importance for the mixing and plasticating result as well as for the mixing and plasticating time. If the percental shear area is small, a comparably long time is required for the mixing or plasticating process, as the resistance against the axial motion of the mixing and plasticating rotor is great. As in this case, however, the percental friction area is correspondingly large, a substantial amount of friction work is applied to the mixing or plasticating material resulting in a substantial heating of the mixing and plasticating material as well as in very efficient plasticating and homogenization. Plastics in powder form, granular form and solid lump form may be plasticated by this friction heat alone. On the other hand, if a large percental shear area is chosen, the resistance against the axial motion of the mixing and plasticating rotor is low and the mixing of plasticating time is correspondingly short, whereas, due to the relatively small friction area, the plastication and homogenization of the mixing and plasticating material is lower than in the previous case and the mixing result is different from the previous result.

Thus, according to the material to be mixed or plasticated, there is an optimal ratio between the percental shear area and the percental friction area. For the mixing and plasticating of plastics and rubber, a percental shear area from about 15 to about 33 percent of the rotor area generally may be considered as optimal.

The specific rotor pressure may be from about 70 to about 7,000 p.s.i. and more, a specific rotor pressure from about 140 to about 1,400 p.s.i. generally being sufficient. A specific rotor pressure from about 350 to about 500 p.s.i. usually gives excellent results when mixing and plasticating plastics and rubber. Higher specific rotor pressures, e.g. may be used for mixing and plasticating processes requiring very high shear gradients, for example to carry out mechanochemical reactions with polymer materials. The friction area pressure, of course, is still higher than the specific rotor pressure, according to the size of the shear area or friction area in each case.

The ratio between the length and the diameter of the mixing and plasticating cylinder may be from about 10:1 to about 0.5:1, a ratio from about 3:1 to about 1:1 being preferred. The ratio between the length of the mixing and plasticating cylinder and the thickness of the mixing and plasticating rotor may be from about 100:1 to about 2:1, a ratio from about 20:1 to about 5:1 being preferred.

The tolerance between the mixing and plasticating rotor and the mixing and plasticating cylinder should, on one hand, be so small that good scrape-off of the internal wall area of the mixing and plasticating cylinder is achieved and any scale formation at the internal wall area is avoided; on the other hand the tolerance should be so dimensioned that the axial motion of the mixing and plasticating rotor is not obstructed, particularly at temperature changes.

Hereinafter some further embodiments of the machine according to the invention are described.

FIG. 20 is contrary to FIG. 1 a side-elevational view of a machine in which the mixing and plasticating rotor together with the rotary drive thereof is axially movable, whereas the mixing and plasticating cylinder is axially not movable. The mixing and plasticating cylinder 8 is mounted between the fixed platen 2' and the axially movable platen 5 by the four tie bolts 9. The gear motor 16', 17' is mounted between the axially movable platens 5' and 6. The bearing housing 12' is provided in 5' and forms one unit with the gear motor 16', 17'. The shaft 10 of the mixing and plasticating rotor is mounted in the coupling 11. Thus, the rotating drive may be axially moved on the tie rods by actuation of the hydraulic cylinder 18. The drive motor 17' may also be provided in another position, e.g. at the side or below the tie rods. As to the drive motor 17', a hydraulic motor is particularly advantageous and this hydraulic motor may be powered by the same hydraulic pump group as the hydraulic cylinder 18 or also by a separate hydraulic pump group, this latter being provided in the machine base. The required axial bearings are partly provided in the bearing housing 12' and partly in the gear drive housing 16'. The mixing and plasticating cylinder 8 may similarly to FIG. 1 be dismounted from the machine by loosening the tie bolts 9 and moving the axially movable platen 5 to the right.

FIG. 21 is a side-elevational view of a machine according to FIG. 20, with the difference, however, that the axially not movable and fixed mixing and plasticating cylinder may be filled and emptied from the end side. The mixing and plasticating cylinder 8', being provided with a flange 50, is guided through a bore of platen 2" at one end and mounted between 2" and 5 by the aid of the flange 50 and tie bolts 9. The tie bolts 9 may be guided through bores of flange 50, as already described in connection to FIG. 17. 5" is a swivel-mounted platen, which is mounted at the ends of tie rods 4 by swivel bolts 51; during the operation of the machine it is secured against the cylinder lid 36 by the removable locking bolts 52.

FIG. 22 is a longitudinal sectional view of the mixing and plasticating cylinder 8' of FIG. 21, the tie bolts 9 as well as any flange bores of flange 50 and of the cylinder lid 35 not being illustrated.

FIG. 23 also illustrates a longitudinal sectional view of the mixing and plasticating cylinder 8' of FIG. 21, the mixing and plasticating cylinder being opened for filling or emptying. The swivel-mounted platen 5" naturally may be swiveled horizontally as well as vertically and it may be actuated manually or automatically. According to FIG. 23, the mixing and plasticating cylinder easily may be filled with mixing and plasticating material and after completed mixing and plasticating process, the material may be pushed out from the mixing and plasticating cylinder by one or more strokes of the mixing and plasticating rotor. Moreover, the mixing and plasticating chamber as well as the mixing and plasticating rotor are very easily accessible from the end opening for any required cleaning procedures between materials of different nature and color, etc. If necessary, the mixing and plasticating rotor may be dismounted from the mixing and plasticating cylinder via the end opening, after the shaft 10 has been separated from the coupling 11 (FIG. 20, 21). At more thorough cleaning procedures or repair work the mixing and plasticating cylinder 8' of course, as previously, may easily be dismounted from the machine by removing the tie bolts 9 of FIG. 21 (not illustrated in FIG. 23) and moving the axially movable platen 5 to the right.

FIG. 24 represents the mixing and plasticating cylinder 8' according to FIG. 23, the mixing and plasticating cylinder being provided with a feeding hopper 53 and a feeding ram 54. Fifty-five is the piston rod of the feeding ram. The feeding ram may be actuated pneumatically or hydraulically, for example, and during the mixing and plasticating process it is held in the position illustrated in FIG. 24. The lower surface of the feeding ram is curved in conformity with the internal cylinder wall, so that the axial motion of the mixing and plasticating rotor is not obstructed by the feeding ram. By the use of the feeding ram single material components may be fed into the mixing and plasticating cylinder without necessarily opening the end closure of the mixing and plasticating cylinder. Moreover, also fillers, pigments and colorants with a large bulk volume may be added during the mixing and plasticating process. Thus, the feeding ram according to FIG. 24 has a similar material feeding function as the ram of the previous art internal mixers; however, it has only secondarily the task to influence the operating pressure substantially in the mixing and plasticating cylinder, as the operating pressure in the machine of the present invention on the first hand is generated directly by the mixing and plasticating means, i.e. by the mixing and plasticating rotor. Thus, instead of a feeding hopper with a feeding ram, in some cases also a feeding hopper with a feeding screw may be used. Such a combination is particularly suitable if for example plastic material in granular form, powder form or scrap form is to be plasticated in the mixing and plasticating cylinder and to be mixed with fillers, pigments, etc. If raw rubber, plastics, etc., in solid lump form, piece form a rod form is to be used, these materials may be filled via the end opening into the mixing chamber and the additional components in powder form, granular form or liquid form may be added via the feeding hopper or feeding pit. Of course, all material components to be mixed or plasticated may also be added via the feeding hopper or feeding pit, as in the case of prior art internal mixers. A substantial advantage of the machine of the present invention according to FIGS. 21–24 is moreover that the ready-mixed batch before the ejection via the end opening by the mixing and plasticating rotor is concentrated and compressed, so that the mixing and plasticating batch is ejected as a nearly homogeneous cylindrical lump of material, which may be directly processed further, e.g. in a calander. In contract to this, in the case of the prior art internal mixers the mixing material is ejected in the form of disconnected and irregular material parts, which before any further processing, e.g. in a calander, first have to be worked on at least one two-roller mill in order to produce a homogeneous roller mill blanket.

FIG. 25, finally, is a side-elevational view of a machine according to FIG. 21, in which only the mixing and plasticating rotor is axially movable, whereas the rotary drive connected to the mixing and plasticating rotor is axially not movable. The drive shaft 13″ of the mixing and plasticating rotor is provided as a splined shaft and mounted between the axially movable platens 5′ and 6 in the bearing housings 12′ and 12″. The axially movable platens 5′ and 6 are firmly connected to each other, e.g. by tie bolts, the latter being not illustrated in FIG. 25. The drive pulley 14′ is axially not movably mounted and via a splined hub it is engaged with the splined drive shaft 13″. Via the transmission 15′ the drive pulley 14′ is connected to the gear motor 16″, 17″. The transmission 15′ may be a V-belt drive, gear belt drive, chain drive or gear drive. The gear motor 16″, 17″ is mounted in the machine base 1. By actuation of the hydraulic cylinder 18 the splined drive shaft 13″ is axially moved in the splined hub of the drive pulley 14′, so that the mixing and plasticating rotor connected to drive shaft 13″ via coupling 11 is axially movable in relation to the fixed gear motor 16″, 17″.

The machine according to the present invention naturally also may be constructed in such a way that the mixing and plasticating rotor and the mixing and plasticating cylinder are mounted vertically. In the case of such an embodiment of the invention, the tie rods and the platens may form a vertical press, the axial motor or the hydraulic cylinder being mounted at the top and the rotary drive at the base or vice versa. It may also be possible to use a frame-type press instead of said tie-rod-type press, the axially movable parts of the machine being guided between the frames on sliding rails, sliding platens or other guiding elements of any kind. Instead of said axial motor, i.e. instead of said hydraulic cylinder 18, also pneumatic cylinders or gear rod drives, screw drives, etc., may be used; in this latter case, however, only relatively small axial forces may be provided. Furthermore, it may also be possible to move the mixing and plasticating cylinder and the mixing and plasticating rotor relatively to each other by means of a horizontal or vertical one-column press, e.g. by using different drill presses or drilling machines. With such machines, however, only relatively small torques and axial forces may be transferred to the mixing and plasticating material, i.e. at best only small amounts of mixing or plasticating material could be worked, and there is the danger of obstruction or "stalling" of the mixing and plasticating rotor due to bad centering or misalignment in the mixing and plasticating cylinder.

The mixing and plasticating cylinder may be manufactured of the usual engineering materials, as steel or stainless steel, or it may also be plated with hard metal. The mixing and plasticating cylinder may also be lined with ceramic materials, e.g. with ceramic hard-sintered materials, which possess approximately the same temperature expansion coefficient as the metallic base material. The internal chamber of the cylinder may also be hard glass enamelled in a manner that is common in the chemical industry, this being particularly advantageous if rubber or other polymeric materials are to be worked at conditions as inert as possible at large pressure, friction and shear forces. This may be desirable, e.g. in the case of mechanochemical breakdown and polymerization reactions with or without free-radical forming agents and in the manufacture of so called polymer alloys or polymer melt emulsions containing extremely finely dispersed starting polymers and blockgrafted polymers.

While specific embodiments of the invention have been shown and described in detail to illustrate the application of the invention principles, it will be understood that the invention may be embodied otherwise without departing from such principles.

What is claimed is:

1. Machine for mixing and plasticating of plastics, rubber and other highly viscous materials at controlled pressure, friction and shear conditions, which comprises a mixing and plasticating cylinder and a mixing and plasticating rotor with aperture passages, the shaft of said mixing and plasticating rotor being connected to a rotary drive outside the mixing and plasticating cylinder, said mixing and plasticating rotor and said mixing and plasticating cylinder being axially movable in relation to each other, during said relative motion of said mixing and plasticating rotor and said mixing and plasticating cylinder the internal wall area of said mixing and plasticating cylinder being scraped off by said mixing and plasticating rotor and the contents of said mixing and plasticating cylinder being pressed through the passages of said mixing and plasticating rotor at friction and shear.

2. The machine according to claim 1, wherein said mixing and plasticating rotor is shaped as a disc or piston.

3. The machine according to claim 1, wherein said mixing and plasticating cylinder is axially not movable, whereas said mixing and plasticating rotor is axially movable.

4. The machine according to claim 1, wherein said mixing and plasticating cylinder is axially movable, whereas said mixing and plasticating rotor is axially not movable.

5. The machine according to claim 1, wherein said mixing and plasticating rotor is axially movable together with the rotary drive.

6. The machine according to claim 1, wherein the mixing and plasticating rotor is axially movable and the rotary drive being axially not movable, said shaft of said axially movable mixing and plasticating rotor being engaged with the rotary drive and axially movable in relation to said rotary drive.

7. The machine according to claim 1, wherein the mixing and plasticating rotor is axially movable together with the rotary drive, said rotary drive being mounted on tie rods and axially movable by at least one double-acting working cylinder on said tie rods.

8. The machine according to claim 1, wherein said passages of said mixing and plasticating rotor are cylindrical or conical bores.

9. The machine according to claim 1, wherein said passages of said mixing and plasticating rotor have a slot cross section or polygonal cross section.

10. The machine according to claim 1, wherein said passages of said mixing and plasticating rotor are beveled and provided in screw-line configuration in relation to the center line of said mixing and plasticating rotor.

11. The machine according to claim 1, wherein the total area of said passages (shear area) of said mixing and plasticating rotor is less than half of the total area of said mixing and plasticating rotor.

12. The machine according to claim 1, said mixing and plasticating rotor being hollow and being cooled or heated via its shaft, which also is hollow.

13. The machine according to claim 1, said mixing and plasticating rotor being hollow and similar to a short tubular heat exchanger.

14. The machine according to claim 1, said mixing and plasticating cylinder being provided with a feeding hopper and a feeding ram or a feeding screw.

15. The machine according to claim 1, said mixing and plasticating rotor being provided with surface projections similar to teeth or pins.

16. The machine according to claim 1, said mixing and plasticating rotor being provided with radial slots or grooves.

17. Machine for mixing and plasticating of plastics, rubber and other highly viscous materials at controlled pressure, friction and shear conditions, which comprises two fixed platens, said platens being connected by at least two tie rods, at least one platen which is axially movable on the tie rods, and at least one double-acting working cylinder, said working cylinder being mounted at one of said fixed platens, said mixing and plasticating cylinder and said mixing and plasticating rotor being mounted between said platens and said tie rods in such relation to each other that they are axially movable relatively to each other by actuation of said double-acting working cylinder.

18. The machine according to claim 17, which comprises a bearing housing, said bearing housing being mounted at one of said two fixed platens, a drive shaft with a coupling, said drive shaft being mounted at said bearing housing, the shaft of said mixing and plasticating rotor being mounted in said coupling and being axially not movable, a rotary drive, said rotary drive being driving said drive shaft as well as said shaft of said mixing and plasticating rotor via a transmission, a double-acting working cylinder mounted at the other fixed platen, and two axially movable platens, said mixing and plasticating cylinder being mounted between said axially movable platens by tie bolts and the piston rod of said double-acting working cylinder being connected to one of said axially movable platens, the mixing and plasticating cylinder being axially movable in relation to said axially not movable mixing and plasticating rotor by actuation of said working cylinder.

19. The machine according to claim 17, which comprises two fixed platens, a rotary drive with a bearing housing for a drive shaft with a coupling, said shaft of said mixing and plasticating rotor being mounted in said coupling, a double-acting working cylinder being mounted at the other fixed platen, and three axially movable platens, said mixing and plasticating cylinder being mounted between said fixed platen and one of said axially movable platens by tie bolts and said rotary drive being mounted between the other two axially movable platens, said mixing and plasticating rotor together with said rotary drive being axially movable in relation to the axially not movable mixing and plasticating cylinder.

20. The machine according to claim 17, which comprises a fixed platen with a bore for said mixing and plasticating cylinder, the latter being provided with a flange, and a swivel-mounted platen provided at the ends of said tie rods, said mixing and plasticating cylinder being guided through said bore of said fixed platen and mounted between said fixed platen and one of said axially movable platens by the aid of said flange and by said tie bolts, said mixing and plasticating cylinder being emptied by swiveling out said swivel-mounted platen and axially moving said mixing and plasticating rotor.

21. The machine according to claim 17, which comprises a rotary drive being mounted outside said axially movable platens and not taking part in the axial motion of said platens, a splined drive shaft being mounted between said axially movable platens in bearing housings, and an axially not movable drive pulley, said drive pulley being engaged with said axially movable drive shaft via a splined hub and being driven by said rotary drive via a transmission, said mixing and plasticating rotor, which is connected to said drive shaft by said coupling, being axially movable in relation to said axially not movable rotary drive.

* * * * *